United States Patent [19]

Hennart et al.

[11] 3,867,526

[45] Feb. 18, 1975

[54] STABILIZED COMPOSITIONS CONTAINING A PHOSPHORIC ACID ESTER PESTICIDE AND AN ALCOHOLIC COMPOUND

[75] Inventors: Claude Hennart, Aubervilliers; Jean-Pierre Mandon, Paris; Georges Martin, Saint Benoit; Bernard Rabussier, Avanton, all of France

[73] Assignee: Ciba-Geigy AG, Basel, Switzerland

[22] Filed: Sept. 20, 1972

[21] Appl. No.: 290,509

Related U.S. Application Data

[63] Continuation-in-part of Ser. Nos. 833,665, June 16, 1969, Pat. No. 3,705,941, and Ser. No. 17,918, March 9, 1970, abandoned.

[30] Foreign Application Priority Data

| Mar. 12, 1969 | France | 69.06859 |
| Mar. 12, 1969 | France | 69.06860 |
| Mar. 12, 1969 | France | 69.06861 |
| Mar. 12, 1969 | France | 69.06862 |
| Feb. 12, 1969 | France | 69.03313 |
| June 21, 1968 | France | 68.156025 |
| Dec. 18, 1969 | Luxembourg | 60052 |

[52] U.S. Cl. ............................................. 424/219
[51] Int. Cl. ............................................. A01n 9/36
[58] Field of Search ........................... 424/219, 222

[56] References Cited
UNITED STATES PATENTS
3,130,120  4/1964  Schultz et al. ..................... 424/219

*Primary Examiner*—Sam Rosen
*Attorney, Agent, or Firm*—Wenderoth, Lind & Ponack

[57] ABSTRACT

Compositions containing a volatile pesticidal phosphoric ester, an alcoholic compound having at 20°C a vapor pressure between 0.01 and 30 TORR and a stabilizing agent for the phosphoric acid ester are disclosed.

12 Claims, No Drawings

STABILIZED COMPOSITIONS CONTAINING A PHOSPHORIC ACID ESTER PESTICIDE AND AN ALCOHOLIC COMPOUND

This application is a continuation-in-part of our copending patent applications Ser. No. 833,665 filed on June 16, 1969, now U.S. Pat. No. 3,705,941 and Ser. No. 17,918 filed on Mar. 9, 1970, now abandoned.

The present invention relates to hydrophobic compositions comprising phosphoric esters as active insecticidal materials.

Such compositions are more particularly useful in permanent insecticidal apparatuses called wick evaporators, which slowly release insecticide vapors into the atmosphere to combat noxious or undesirable insects such as flies, mosquitos, gnats, cockroaches, wasps, fleas, bugs, ants, mites etc.

It is known to evaporate insecticidal phosphoric esters dispersed, for example, in a solid solution in polyvinyl chloride.

With this mode of insecticide release, the daily evaporation of the active substance is not constant; it decreases regularly as the usage is prolonged; as a result, the efficacy varies with time, and it becomes progressively weaker, becoming zero well before the evaporation of the active substance contained in the solid solution is complete.

To avoid this disadvantage, it has been attempted to increase the quantity of active substance introduced into the polyvinyl chloride resin; the time of efficacy can therefore be prolonged, but in return the rate of evaporation which is greatly increased above the required level during the first few days of use can reach values which are no longer harmless, and can be very toxic, to mammals, and particularly to human beings, when such use takes place in a closed room.

This decrease of the rate of evaporation of the active substance makes the use of the aforesaid compositions uneconomic, as more than the phosphoric ester used is still present when the efficacy of the composition has become practically nil.

It is likewise known to use an evaporator apparatus in which a porous of fibrous material, such as an agglomeration of organic and/or mineral fibres, or a permeable ceramic, can be fed by a volatile liquid on one part of its surface while the liquid gradually evaporates through the other part in contact with the atmosphere. When the volatile liquid is a phosphoric ester, then certain of these esters, mainly those of greatest insecticidal efficacy, have the disadvantage of hydrolising rapidly if they are exposed to the ambient air over a large surface. Such is the case if the esters are used in the pure state in a wick evaporator apparatus; they take up the humidity in the atmosphere very rapidly and are thus very rapidly hydrolysed; it has been found that in this case the hydrolysis does not stop at the level of the evaporation surface, but affects the contents of the reservoir to a large degree.

This disadvantage must be met by use of a correspondingly increased amount of active substance, or, without such increase, it leads to a greatly diminished time of efficacy. In addition, the accumulation of decomposition products on the evaporation surface disturbs the regularity of the evaporation.

Furthermore, the use of alcohols, in insecticidal compositiions based on phosphoric esters, as solvents or diluents for the esters is well known. It has been proposed, for example to use alcohols having at least 10 carbon atoms in solid compositions based on 0-(2,2-dichlorovinyl)-0,0-diemthyl phospate, or DDVP, from which the volatile and insecticidal phosphoric ester can evaporate into the atmosphere.

Stabilizers such as, for example, epoxidized compounds or polyamines, have been recommended with a view to protecting the phosphoric esters from hydrolysis. However, these stabilizers are in general only slightly volatile and can thus be used only in small quantities to avoid their accumulation on the wick; the efficacy of these stabilizers is accordingly reduced. It has been found that above a maximum limit of 3percent, the accumulation of these stabilizers on the evaporative surface generally gives rise to a rapid decrease in the rate of a evaporation.

An apparently simple method of avoiding or substantially reducing hydrolysis of phosphoric esters consists in using solutions of these esters in hydrocarbons; all the same, the unsaturated hydrocarbons are unsuited, on account of their high toxicity and disagreeable odour, to be used as the sole solvent. The saturated hydrocarbons are not toxic, but possess much too weak a solvent power so that their use in evaporator devices would give too weak, a release of insecticide vapor to be efficacious, or would necessitate a reservoir and an evaporation surface of exaggerated dimensions.

It has been found that completely hydrophobic solutions of phosphoric esters of sufficiently high concentration can be obtained by adding to the solution of such ester in a saturated hydrocarbon solvent a relatively small amount of certain co-solvents (or stabilizers) which are described in detail further below. The hydrophobic properties of such solutions are completely satisfactory, even in the case where the co-solvent is itself very hydrophilic.

It is an object of the invention to provide liquid hydrophobic compositions which will satisfy the following requirements:

1. permitting their use in devices diffusing into the atmosphere, permanently, insecticidal vapors, without risk of premature decomposition, more particularly of the active material;
2. permitting as complete evaporation as possible of the active substance used;
3. permitting a regular and constant evaporation and therefore an insecticidal efficacy constant in time.

These objects are attained by the hydrophobic compositions provided by the invention. These compositions are characterized in that they comprise a. at least one insecticidal volatile phosphoric ester as defined infra, as active material;
b. about 1 to 80 percent of a compound carrying at least one alcoholic hydroxy group per molecular, and acting as solvent on (a)
c. from about 0.1 to 20 percent of a stabilizing agent for said phosphoric ester, all percentages being based on the total weight of the composition and
d. optionally a saturated aliphatic hydrocarbon in which case component (b) acts as co-solvent.

Compositions according to the invention can contain from about 1 up to 95 percent of active substance calculated on the weight of the composition. Preferably the proportion of active substance is between 3 and 25 percent based on the weight of the composition.

When containing component (d), these compositions can contain up to 40 percent of co-solvent calculated on the weight of the composition. Preferably, this porportion is between 1 and 20 percent based on the weight of the composition. Of course, a sufficient amount of component (d) should then be present in order to guarantee, jointly with the co-solvent present in the above-given limits, a complete dissolution of all of the active substance.

Depending on the amount of insecticidal phosphoric ester present in such compositions containing component (d) this leaves for the latter a proportion ranging from about 4 up to about 90 percent of the total weight of the composition.

The compositions according to the invention have the property of a particularly high stability to aging, which permits a longer storage and in consequence, in use, either an increase in their duration of use or an increase in their efficacy during a given period.

The present invention is based on an unexpected discovery. This discovery, which does not result from the known state of the art, is that certain phosphoric esters are sensitive to the action of organic compounds carrying at least one free group of the nature of an alcoholic hydroxy group. This results in partial decomposition of the esters, more or less rapid in time, and in consequence a reduction in the efficiency of compositions in which these esters and these alcoholic compositions are present.

The reactivity of such alcoholic compounds has been shown by the experiments hereinafter set forth.

The different constituents of the compositions of the invention will now be described in detail.

The active substance comprises at least one volatile phosphoric ester possessing weak stability in a humid atmosphere, and falling under the general formula

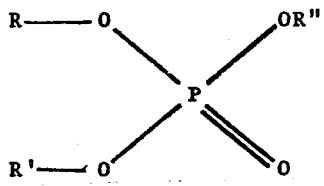

in which R and R' are the same or different alkyl residues, containing from 1 to 3 carbon atoms, and R" is one of the following two groups:

a) 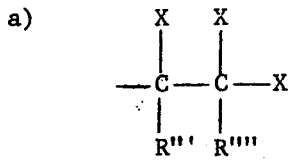

in which R''' and R'''' are the same or different and are each hydrogen, halogen or alkyl of from 1 to 3 carbon atoms, and X is halogen, and b) 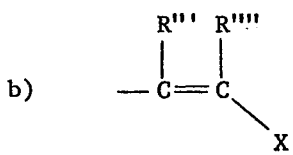

in which R''', R'''' and X have the meanings just assigned.

As non limitative examples of esters corresponding to the general formula given, there can be noted the following phosphoric esters:
2,2-dichlorovinyl dimethyl phosphate
2,2-dichlorovinyl diethyl phosphate
2,2-dichlorovinyl dipropyl phosphate
2,2-dichlorovinyl dibutyl phosphate
2,2-dibromovinyl dimethyl phosphate
2,2-dibromovinyl diethyl phosphate
2,2-dibromovinyl dipropyl phosphate
2-bromo 2-chlorovinyl dimethyl phosphate
2-bromo 2-chlorovinyl diethyl phosphate
2,2-dichlorovinyl ethylmethyl phosphate
1,2 dibromo-2,2-dichloroethyl dimethyl phosphate
1,2-dibromo-2,2-dichloroethyl diethyl phosphate
1-bromo-2,2,2-trichloroethyl dimethyl phosphate
1-bromo-2,2,2-trichloroethyl diethyl phosphate
1,2,2,2-tetrabromoethyl dimethyl phosphate
1,2,2,2-tetrabromoethyl diethyl phosphate
1,2-dibromo-2,2-dichloropropyl diemthyl phosphate
1,2-dibromo-2,2-dichloropropyl diethyl phosphate
2,2-dichloro-2-methylvinyl dimethyl phosphate
2,2-dichloro-2-methylvinyldiethyl phosphate.

For the purpose of the present invention, the preferred esters of those just quoted are those in which the group R" is a —CH = CCl$_2$ group, i.e. the 2,2-dichlorovinyl dialkyl phosphates; in this latter group is 2,2-dichlorovinyl dimethyl phosphate, known as DDVP and DICHLORVOS.

Alcoholic compounds suitable as components (b) are "organic compounds containing at least one alcoholic hydroxyl group." Chemical classes comprised by this term are in particular:

1. saturated or unsaturated primary, secondary or tertiary
   aliphatic alcohols
2. saturated or unsaturated alicyclic alcohols
3. aralkanols and aralkenols
4. glycols and their monoesters and monoethers
5. partially esterified and/or etherified polyols The alcoholic compounds are chosen with regard to the value intended for them in the insecticidal composition. Indeed, they may be incorporated a. as principal solvents or diluents of the phosphoric ester or esters used
b. as supplementary reinforcing solvents (co-solvents) to non-hydroxyl solvents or diluents for the phosphoric ester or esters,
c. as odorant products, such natural or synthetic odorants as geraniol, linalol, terpineol, menthol and citronellol, or compositions containing one or more of these odorant materials
f. supplementary active materials, such as an acaricidal agent (chlorobenzilate, chloropropylate, dicofol, dichloropenylethanol, etc.) and insect-repellant agent (hydroxyethylthiooctane, ethohexadiol, butylethyl propane diol, etc.) a bird-repellant (for example chlorlose), or a fungicidal agent (cycloheximide, hydroxyethylheptadecyl-glyoxalidine, pentachlorbenzyl alcohol, etc.)

Some alcoholic compounds may be present fortuitously in insecticidal compositions. It is a matter, for example, of impurities contained in non-hydroxylated solvents or diluents used in the preparation of insecticidal compositions.

It follows from the foregoing that serveral alcoholic compounds may be found simultaneously in the insecticidal compositions, each one of them playing its own role, voluntarily or otherwise, and that the quantities incorporated are very variable.

The stabilised insecticidal compositions of the invention may be solid, as well as liquid, and may contain or be supported as desired by, inert bodies such as for example, fibres or powders of animal, vegetable or mineral origin.

Suitable relatively inert adjuvants in the compositions according to the instant invention, are for example the following: brick, pumice, vermiculite, kaoline, dry clay, calcium carbonate, pyrophyllite, dolomite, glass fibers, plaster of Paris, talcum, fossil or non-fossil, natural silica, synthetic silica, and metallic oxides. Inert organic additives which can be added to the compositions according to the invention are, for example, wood dust, cellulose fibers, starch, dextrin, sugars and/or sparingly solvent diluants such as paraffin which may be modified by the addition of synthetic organic resins and/or salts formed alkylamino-alkylamines and aliphatic acids and/or amino derivatives of montmorillonite such as bentones.

Especially the alcoholic compounds envisaged by the invention as co-solvents are liquids or solids having a low melting point.

Their vapour pressure at 20°C is preferably between 0.01 and 30 Torr, and more preferably between 0.01 to 5 Torrs. This corresponds generally to products distilling at atmospheric pressure, between 100° and 320°C, preferably between 140 and 270°C.

By "alcoholic compounds" are meant organic compounds having at least one hydroxy group per molecule. Preferably these alcoholic compounds belong to the following categories:

1. Primary, secondary or tertiary, saturated or non-saturated, aliphatic hydroxylated compounds corresponding to the following general formula:

$$X_a - A - OH$$

wherein $X_a$ represents a hydrogen atom or a chlorine atom or an alkylthio or alkoxy group containing 1 to 10 carbon atoms or an alkoxyalkoxy group containing 2 to 6 carbon atoms. A represents a divalent, straight or branched-chain hydrocarbon group containing 2 to 6 carbon atoms which number may be up to 20 carbon atoms when $X_a$ represents as hydrogen atom. Such hydroxylated acyclic compounds are, for example, the following: 2-methoxy-ethanol, 2-ethoxy-ethanol, 2-butoxy-ethanol, methanol, ethanol, propanol, isopropanol, butanol, isobutanol, sec-butanol, tert-butanol, pentanol, isopentanol, hexanol, octanol, sec-octanol, decanol, undecanol, dodecanol, tetradeconol, hexadecanol, octadecanol, octadec-9-en-1-ol, undec-10-en-1-ol, 2-ethyl-hexan-1-ol, 3,7-dimethyl-octan-1-ol, linalool, nerol, geraniol, citronellol, hex-3-en-1-ol, 3,6-dioxa-octan11-ol, 3,6-dioxa-nonan-1-ol, 3,6-dioxadecan11-ol, hydroxyethylthiooctane, allyl alcohol, 2-chloro-ethanol.

2. Alicyclic hydroxylated compounds corresponding to the following general formula:

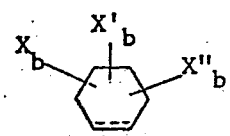

wherein $X_b$ represents a hydrogen atom or one to four alkyl radicals containing 1 to 5 carbon atoms; $X'_b$ represents a hydrogen atom or an alkenyl radical containing 2 to 4 carbon atoms; $X''_b$ represents a hydroxy group or a hydroxyalkyl group containing 1 to 5 carbon atoms; the dotted line represents an optional second bond.

Such alicyclic hydroxylated compounds are, for example, the following: cyclohexanol, 3-methylcyclohexanol, 3,3,5-trimethyl-cyclohexanol, menthol, α-terpineol, β-terpineol, and γ-terpineol.

3. Araliphatic alcohols being aralkanols or aralkenols corresponding to the following general formula:

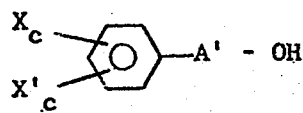

wherein A' represents a saturated or ethylenically unsaturated, straight or branched-chain aliphatic hydrocarbon group containing up to 5 carbon atoms; $X_c$ represents a hydrogen atom or 1 to 5 halogen atoms selected from chlorine or bromine; $X'_c$ represents a hydrogen atom or 1 to 3 alkyl radicals containing 1 to 6 carbon atoms, (the total number of $X_c + X'_c$ naturally not exceeding five).

Such aromatic alcohols are, for example, the following: benzyl alcohol, 2-phenyl-ethanol, 1-phenyl-ethanol, 1-phenyl-propan-1-ol, 1-phenyl-propan-2-ol, 3-phenyl-propan-1-ol, cinnamic alcohol, p-methylcinnamic alcohol, P-chlorobenzyl alcohol, p-methlbenzyl alcohol, dichlorophenylethanol, pentachlorobenzyl alcohol.

4. Benzhydrol and derivatives thereof corresponding to the following general formula:

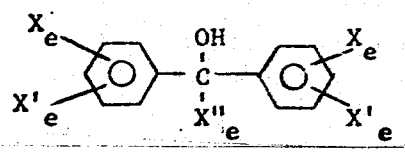

wherein $X_e$ represents a hydrogen atom or 1 to 5 halogen atoms selected from chlorine and bromine; $X'_e$ represents a hydrogen atom or 1 to 3 alkyl radicals containing 1 to 6 carbon atoms; $X''_e$ represents a hydrogen atom or a cyano or carboxy group, of an alkoxycarbonyl group containing 1 to 6 carbon atoms, or an alkyl radical contaning 1 to 4 carbon atoms, said radical being optionally substituted by 1 to 3 chlorine atoms.

Such benzhydrols are, for example, the following: benzhydrol itself, 4,4'-dichloro-benzhydrol, 4,4'-dichloro-α-trichloromethyl-benzhydrol (g), 4,4'-dichloro-ethylbenzilate (h), 4,4'-dichloro-isopropylbenzilate (i), 1,1-bis-(4-chlorophenyl)-ethanol, 1,1-bis-(4-chloro-phenyl)-propanol (j); of these compounds, (g) is an acaricide known as Dicofol, (h) is an acaricide known as Chlorobenzilate, (i) is an acaricide known as Chloropropylate, and (j) is an acaricide known as DCPC.

5. Polyols corresponding to the following general formula:

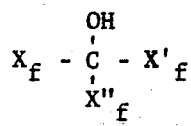

wherein $X_f$ represents either an alkyl radical having 1 to 6 carbon atoms and substituted by 1 to 5 hydroxy groups, said radical being optionally further substituted by a phenyl, chlorophenyl or nitrophenyl radical, or an alkanoylamino group having 2 to 6 carbon atoms and which may be substituted by 1 to 3 chlorine atoms; $X'_f$ represents a hydrogen atom or an alkyl radical having 1 to 6 carbon atoms or a phenyl radical which may be optionally substituted by 1 to 3 chlorine atoms and/or by a nitro group; $X''_f$ represents a hydrogen atom or an alkyl radical having 1 to 4 carbon atoms and optionally substituted by 1 to 3 chlorine atoms.

Such polyols are for example the following: propane-1,2-diol, ethylene-glycol, propylene-glycol, glycerol, glycerol-60 -chlorohydrin, glycerol-β-chlorohydrin, sorbitol, 2-ethyl-hexane-1,3-diol (k), an insect repellent known as Ethohexadiol, 2-butyl-2-ethyl-propane-1,3-diol, Chlorampenicol.

6. Esters of the above polyols having at least one free hydroxy group and formed from saturated or ethylenically unsaturated aliphatic acids having 2 to 20 carbon atoms.

7. Oxirane condensation products (alkylene oxides) corresponding to the general formula:

$$X_j - O - (A'' - O)_n - A'' - OH$$

wherein $A''$ represents a straight or branched-chain, saturated aliphatic hydrocarbon group having 1 to 4 carbon atoms; n represents a whole number from 1 to 150; $X_j$ represents a hydrogen atom or an alkyl radical containing 1 to 6 carbon atoms or an alkanoyl or alkenoyl group having 2 to 20 carbon atoms.

Such oxirane condensation products are, for example, the following: diethylene glycol, triethylene glycol, dipropylene glycol, tripropylene glycol, dibutylene glycol, polyethylene glycols having a molar mass of from 200 to 6000 gram moles, polypropylene glycols having a molar mass of from 200 to 6,000 gram moles, monolaurates, monopalmitates, monostearates and monooleates of these glycols; methyl, ethyl, propyl and butyl monoethers of these glycols.

In addition to the latter category, there may be mentioned the oxyalkylenated, partially esterified derivatives of sorbitan, such as the monolaurate, monopalmitate, monostearate, monooleate, trioleate and tristearate of sorbitan, condensed with 4 to 20 moles of ethylene oxide, and unesterified condensation products of sorbitan and 4 to 20 moles of ethylene oxide.

Especially preferred alcoholic compounds belong to the groups hereafter noted, for each of which non-limitative examples have been given.

1a. Aliphatic alcochols falling under the general formula $$R_c - A' - OH$$

wherein $R_c$ represents hydrogen or alkoxy of 1-6 carbon atoms or alkoxyalkoxy of 2-6 carbon atoms, $A'$ is a straight or branched chain hydrocarbon group of 1-6 carbon atoms, this number being able to be raised to 14 carbon atoms when $R_c$ is hydrogen.

Examples are: 2-butoxyethanol, 1-octanol, 2-octanol, 1-heptanol, 2-ethyl-1-hexanol, 3,6-dioxa-1-octanol, 3,6-dioxa-1-nonanol, linalol, 3,7-dimethyl-1-octanol.

2a. Alicyclic alcohols falling under the general formula

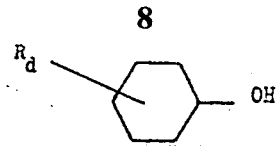

in which $R_d$ is hydrogen or one to four alkyl groups of 1–5 carbon atoms.

Examples are: 3-methylcyclohexanol, menthol, 3,3,5-trimethyl cyclohexanol;

3a. Aralkanols falling under the general formula

wherein $R'_d$ is hydroxyalkyl of 1–5 carbon atoms, and $R''_d$ represents one to three atoms of chlorine and/or one to two alkyl groups of 1–4 carbon atoms. 1-Phenyl-2-propanol is an example of this type of compound.

As stabilizing agents then are preferred epoxy or amino compounds present in small quantities; the stabilisers are preferably used in a maximum proportion of 3 percent, more preferably 2 percent.

Epoxide compounds which are the most preferred stabilizing agents in the compositions according to the invention are compounds containing an epoxy group and preferably falling within the following classes, given by way of non-limitative example:

the alkyloxitanes such as those known as propylene oxide, butylene oxide, epichlorohydrin, 2,3-epoxypropanol, phenoxymethyl oxitane, the aryloxitanes such as styrene oxides, the epoxy cyclanes such as cyclohexane oxide and 9.10 -epoxy-cyclododeca-1,5-dience, the epoxidised acid esters such as the alkyl and cycloalkyl epoxy tallates and epoxy stearates the glycerides containing an epoxidised acyl residue such as epoxidised coils.

the glyceric esters such as ethyl phenylglycidate.

The preferred epoxidised compounds are the alkyl and cycloalkyl 9,10-epoxy stearates and the glycerides containing epoxy stearic acids such as the epoxidised oils of soya, poppy, sunflower, flax and china-wood.

The quantity of epoxy compounds used separately or in admixture is generally between 0.1 and 20 percent by weight of the insecticidal composition and preferably between 0.2 and 10 percent.

This quantity depends on a certain number of parameters among which are in the first place the moisture content and acidity of the composition. It is known indeed that acids destroy the epoxy compounds and that the acidity of the composition can increase with time under the effect the hydrolysis of the phosphoric esters consequent on the humidity.

Preferably, to take account of the two foregoing parameters, one utilises a quantity of epoxy compound at least stoichiometrically equivalent to compensate the sum of the acidity present in the composition and the potential acidity which can arise by hydrolysis of the phosphoric ester.

The quantity of epoxy compound added to the composition depends also on the molecular weight of the epoxy compounds themselves, the sensitivity of the phosphoric esters to the alcoholic compounds and to the degree of reactivity of these latter. To take account of these last parameters one advantageously increases the quantity of stabilisers determined for the compensation of the acidity by an addition of the same epoxy compounds. This addition will be greater with a phosphoric ester containing a methyl group than with the same weight of a phosphoric ester containing an ethyl group. Further, an alcoholic compound having a primary hydroxy group needs a weight equal to a stronger addition of stabilizer than that necessary with an alcoholic compound having a hydroxyl group which is secondary or tertiary.

The quantity of epoxy compound added to the composition thus depends on the respective quantities of the phosphoric esters and alcoholic compounds which are included in the composition.

Optional components (d) are saturated hydrocarbons of the aliphatic series, straight and branched chain, and of the alicyclic series.

These components (d) can be pure products or mixtures, having a vapor pressure at 20°C between 0.001 and 30 Torr, preferably between 0.1 and 5 Torr; components (d) which are liquid correspond preferably to products distilling, at atmospheric pressure, between 100° and 320°C, preferably between 140° and 270°C.

Among the hydrocarbon liquids fulfilling the criteria noted, one can give the following examples:

|  | Distillation (Point°C) | Vapor pressure at 20°C (TORR) |  |
|---|---|---|---|
| n-nonane | 151°C | 3.5 | TORRS |
| n-decane | 174°C | 1.3 | — |
| n-undecane | 197°C | 0.45 | — |
| n-dodecane | 216°C | 0.15 | — |
| n-tridecane | 234°C | 0.08 | — |
| n-tetradecane | 252°C | 0.02 | — |
| 2.6-dimethyl-octane | 159°C | 2.5 | — |
| white spirit | 150/205°C | 0.2/3.5 | TORRS |
| "Isopar L" (a) | 189/205°C | 0.2/0.6 | — |
| "Soltrol 130" (b) | 176/208°C | 0.2/1.2 | — |
| "Soltrol 160" (b) | 189/205°C | 0.2/0.6 | — |
| "Aliphatic Solvent 55" (c) | 169/195°C | 0.5/1.6 | TORRS |
| illuminating oil | 160/230°C | 0.1/2.6 | — |
| kerosene | 190/235°C | 0.08/0.6 | — |
| o-menthane | 171°C | 2.0 | TORRS |
| m-menthane | 158°C | 2.0 | — |
| p-menthane | 169°C | 2.0 | — |
| decalin | 187/195°C | 0.9/3 | TORRS |
| 3,3,4,4-tetramethyl-hexane | 170°C | 1.5 | — |
| isoamylcyclohexane | 193°C | 1.0 | — |
| "Solpar 195/230+ (d) | 194/225°C | 0.1/0.5 | TORRS |
| "Solnap" (e) | 150/195°C | 0.5/3.5 | — |
| "Solvent 30" (f) | 160/200°C | 0.1/2.5 | — |
| Amsco Solvent 140 (g) | 186/206°C | 0.2/1.0 | — |
| Apco Solvent 140 (h) | 181/202°C | 0.3/1.1 | — |
| Odorless Atlantic Solvent (j) | 179/201°C | 0.3/1.2 | — | a) mixture of synthetic branched aliphatic hydrocarbons, constituted by a mixture of decanes, undecanes and dodecanes, produced by the French Company ESSO Standard of Paris, France, having about 11 carbon atoms;

b) mixture similar to Isopar L manufactured by the U.S. Company Philips Petroleum Co. of Bartlesville, Oklahoma;

c) mixture of hydrocarbons of petroleum origin manufactured by the French Company ESSO Standard of Paris, France;

d) mixture of normal paraffin hydrocarbons produced by the British Company British Petroleum Chemicals Ltd. of London, England;

e) mixture of normal paraffin hydrocarbons produced by the British Company British Petroleum Chemicals Ltd. of London, England;

f) mixture of normal paraffin hydrocarbons produced by the Swiss Company Schweizerische Sprengsoffabrik of Dottikon, Switzerland;

g) mixture of hydrocarbons of petroleum origin sold by American Mineral Spirits Co., Murray Hill, New Jersey;

h) mixture of hyrocarbons of petroleum origin sold by the U.S. Company Apco Oil Corporation of Oklahama City, Oklahoma;

j) mixture of hydrocarbons of petroleum origin produced by the U.S. Company Atlantic Refining Co., of Philadelphia, Pa.

The insecticidal compositions of the invention can optionally contain other materials added in order to obtain the necessary physical characteristics; preferably that these additive materials should be volatile in the conditions of use of the said compositions.

The additives are preferably complementary insecticides and/or insect repellents usable in a porportion of 0.1–20 percent by weight of the compositions, preferably 0.5–10 percent. For this, one can, for example, add 1, 2, 3, 4, 5, 6-hexachlorocyclohexane, and more particularly its gramma isomer known as lindane, 1,4-dichlorobenzene, the trichlorobenzenes, the tetrachlorobenzenes, pentachlorobenzene, hexachlorobenzene, naphthalene, bromonaphthalene, the dichloronaphthalines, aldrin and dimethylphthalate.

The properties of stabilised insecticidal compositions according to the invention have been examined in the course of experiments of which some examples will now be given:

EXPERIMENT A

A solution of the following compositions is prepared:

| | |
|---|---|
| DDVP (technical grade) | 7.5 g. |
| Secondary octanol | 1 g. |
| Inert solvent | 91.5 g. |

In this experiment and those which follow, the inert solvent is constituted by a mixture of saturated aliphatic hydrocarbons containing an average of 11 carbon atoms and having a density of 0.767 g/ml at 15°C.

The moisture content of the solvent mixture (octanol plus inert solvent) was about 1 millimole; after forming the solution its content of DDVP was 33.8 millimoles and that of octanol was 7.7 millimols.

This solution was kept at 55°C for 30 days in a hermetically sealed vessel; at the end of this time the content of DDVP was measured by gaseous phase chromatography (aerograph apparatus type 90 P4; 5-foot column of ¼inch diameter, of silicone XE60 on SIL-O-CEL C22 of 250/500 microns, temperature 190°C, detection by catharometer): content of DDVP found, was 29,5 millimols, which indicates a destruction of 33.8-29.5 = 4.3 millimols.

The content of octanol, at the end of the same period was measured by gaseous phase chromatography (aerograph apparatus type 204; 5-foot column 1/8 inch diameter of "CARBOWAX" 4000 a SIL-O-CEL C22 of 250/500 microns temperture 145°C detection by ionisation of flame): the octanol content was found to be 4.2 millimols, which indicates a distinction of 7.7 - 4.2 = 3.5 millimols.

The sum of this first experiment can be expressed as follows:

| DDVP destroyed | 4.3 millimols |
|---|---|
| destruction due to moisture | 1.0 millimols |
| Difference | 3.3 millimols |
| octanol destroyed | 3.5 millimols |

These results show that the quantity of octanol destroyed corresponds to that of the DDVP which has disappeared. taking into account the known hydrolysing effect of the moisture; the presence of the octanol therefore promotes the decomposition of the phosphoric ester.

EXPERIMENT B

A solution of the following composition was prepared:

| DDVP (technical grade) | 7 g. |
|---|---|
| Primary octanol | 5 g. |
| Inert solvent | 88 g. |

The moisture content of the solvent mixture (octanol plus inert solvent) was about 1.5 millimols; after forming the solution its content of DDVP was 30.4 millimols and its content of octanol was 38.4 millimols.

This solution was maintained at 20 ± 2°C for 200 days in a hermetically sealed vessel; at the end of this period the content of DDVP and of octanol was measured by gas chromatography as described in Experiment A: the content of DDVP was found to be 21.2 millimols, which indicates as destruction of 30.4 – 21.2 = 9.2 millimols; the content of octanol was found to be 30.6 millimols which indicates a destruction of 38.4 – 30.6 = 7.8 millimols.

The sum of this second experiment can be expressed as follows:

| DDVP destroyed | 9.2 millimols |
|---|---|
| Destruction due to moisture | 1.5 millimols |
| Difference | 7.7 millimols |
| Octanol destroyed | 7.8 millimols |

These results show that the reaction between a phosphoric ester such as DDVP and an alcohol, in light at 55°C in Experiment A, takes place also at ambient temperature.

Other experiments have enabled us to establish that the degradation products of DDVP and primary octanol are respectively 0-(2,2-dichlorovinyl)-0-methyl hydrogen phosphate and 1-methoxy-octane.

The following reaction scheme may be written:

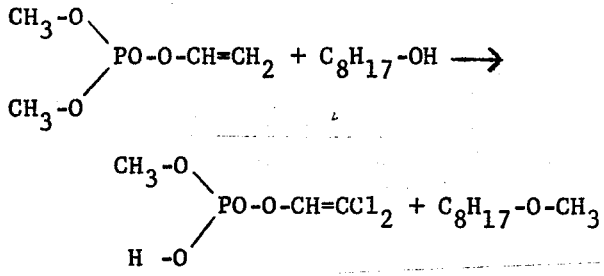

or more generally

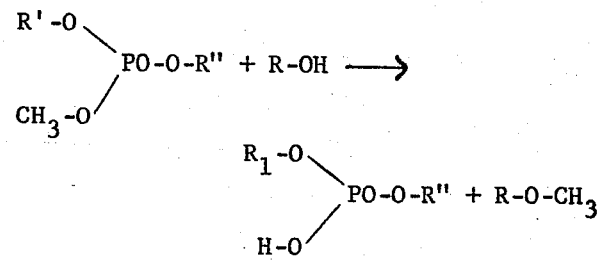

EXPERIMENT C

Solutions in various alcohols containing 50 percent by weight of DDVP were prepared; each solution was divided into several parts each placed in a separate phial. All the phials are placed in a water-bath of which the temperature was maintained at 95/100°C; every two hours a phial of each solution was removed and a potentiometric estimation of the acidity was made, from which the extend of destruction of the DDVP could be established; the following table gives the amounts destroyed at 2, 4, 8, 12 and 20 hours on four of the solutions tested.

| Alcohol tested | Duration of Heating (in hours) | | | | |
|---|---|---|---|---|---|
| | 2 | 4 | 8 | 12 | 20 |
| Secondary Octanol | 9.7% | 16.8% | 17.6% | 38.5% | 55.5% |
| Primary Octanol | 3.4% | 32.0% | 47.0% | 58.5 | 71.5% |
| Normal Dodecanol | 16.8% | 19.0% | 33.0% | 46.0% | 61.5% |
| Linalol | 8.0% | 10.3% | 19.9% | 30.0% | 50.0% |

EXPERIMENT D

A solution of the following composition was prepared:

| DDVF | 7.7% |
|---|---|
| Anhydrous secondary octanol | 5.0% |
| Inert solvent | 87.3% |

Further, a solution as above was prepared replacing 0.4 percent of the inert solvent by epoxidised soya oil. Each of the two solutions was placed in a hermetically sealed flask and maintained at 20 ± 2°C for 6 months.

At the end of this period the DDVP was estimated in each solution by means of a potentiometric method based on the reactivity of sodium N,N-diethyl dithiocarbamate with DDVP. In the case of the solution without the epoxide compound a destruction of 7 g of the DDVP used was noted: in the case of the solution containing epoxidised soya oil, no destruction was registered.

EXPERIMENT E

Eight solutions were prepared as defined in the following table.

| | A | B | C | D | E | F | Y | Z |
|---|---|---|---|---|---|---|---|---|
| DDVP | 20.0 | 20.0 | 20.0 | 20.0 | 20.0 | 20.0 | 20.0 | 20.0 |
| Primary octanol % | 78.5 | 78.5 | 77.8 | — | — | — | 80.0 | — |
| Secondary octanol % | — | — | — | 78.5 | 78.5 | 77.0 | — | 80.0 |
| Epoxidised soya oil % (a) | — | — | 3.0 | — | — | 3.0 | — | — |
| Epichlorhydrin % | 1.5 | — | — | 1.5 | — | — | — | — |
| Phenyloxirane % (b) | — | 1.5 | — | — | 1.5 | — | — | — |

(a) product commercialised under the mark 'ABRAC A' by the firm Boake Roberts & Co. of London and having a titre of 6 to 6.5% epoxy oxygen.

(b) compound commercialised under the name "styrene oxide" by the United States Company, Union Carbide Chemical Co. of New York, N.Y.

These solutions were each placed in a hermetically sealed flask maintained at 20°± 2°C for 60 days. At the end of this period, the quantities of DDVP destroyed in each of the solutions were determined by analysis; the results are summarised in the following tables.

| 1. Solutions based on primary octanol | | | |
|---|---|---|---|
| A | B | C | Y |
| 8.1% | 8.4% | 7.4% | 12% |

| 2. Solutions based on secondary octanol | | | |
|---|---|---|---|
| D | E | F | Z |
| 2.4% | 3.7% | 1% | 6.4% |

These experiments show that for the 4 solutions A, B C and Y containing primary octanol, the destruction of DDVP present in the stabilised solutions A, B and C is less great than that observed for DDVP present in the unstabilised test solution Y.

Similarly they show that for the 4 solutions D, E, F and Z containing secondary octanol, where the destruction of the DDVP is less, a difference of destruction of the phosphoric ester is much less great in the three stabilised solutions D, E, and F than in the unstabilised test solution Z.

EXPERIMENT F

Eight solutions were prepared as defined in the following table:

| | G | H | J | K | L | M | N | X |
|---|---|---|---|---|---|---|---|---|
| DDVP % | 7.5 | 7.5 | 7.5 | 7.5 | 7.5 | 7.5 | 7.5 | 7.5 |
| Secondary octanol % | 3.0 | 3.0 | 3.0 | 3.0 | 3.0 | 3.0 | 3.0 | 3.0 |
| Inert Solvent % | 89.1 | 89.0 | 88.5 | 88.5 | 88.5 | 88.5 | 89.5 | — |
| Epichlorhydrin % | 0.4 | — | — | — | — | — | — | — |
| Phenyloxirane % (b) | — | 0.5 | — | — | — | — | — | — |
| Epoxidised soya oil % (a) | — | — | 1.0 | — | — | — | — | — |
| Epoxidised soya oil % (c) | — | — | — | 1.0 | — | — | — | — |
| 9,10-Epoxy-alkyl stearate % (d) | — | — | — | — | 1.0 | — | — | — |
| 9,10-Epoxy-cyclo-alkyl stearate % (e) | — | — | — | — | — | 1.0 | — | — |
| 9,10-Epoxy-octyl stearate % (f) | — | — | — | — | — | — | 1.0 | — |

(c) product commercialised under the mark 'TAVOXY 64' by the company SOLVAY & Cie. having a titre of about 6.2% epoxy oxygen.
(d) product commercialised under the "EPOXY D-72" by the German company HENKEL INTERNATIONAL G.m.b.H of Dusseldorf, Germany, and having a titre of 4.5 to 5% epoxy oxygen.
(e) product commercialised under the mark EPOXY HS 235 by the German Company HENKEL above, and having a titre of 4.5 to 5% epoxy oxygen.
(f) product commercialised under the mark OXY-ES by the French Company MELLE-BEZONS.

These solutions were each placed in a hermetically sealed flask maintained at 40°C for 150 days. At the end of this period, the quantities of DDVP destroyed in each of the solutions was determined by analysis; the results are summarised in the following table:

| G | H | J | K | L | M | N | X |
|---|---|---|---|---|---|---|---|
| 41.3% | 25.3% | 20.0% | 6.6% | 18.0% | 16.0% | 21.3% | 81.3% |

It is to be noted here also in this last experiment that the destruction of DDVP contained in the unstabilised test solution X is incomparably greater than in the other stabilised solutions, all these solutions containing a solvent mixture constituted by secondary octanol and the same inert solvent.

The three Experiments D, E, F effected following different operative conditions show that the epoxide compounds prevent, retard, or delay, the decomposition of preparations containing a phosphoric ester and an alcohol. As can be observed the best results have been obtained in Experiment D where the alcohol is a co-solvent.

EXPERIMENT G

Seven solutions containing an equimolar mixture of DDVP and 1-butanol were prepared as follows:

Preparation G - 0

DDVP, technical: 74.9%

1-butanol: 25.1%

Preparation G - 1

Preparation G - 0: 99%

α-(1-naphthylhydrazono)-[4-(1,2-dihydro-2-oxo-phenylidenehydrazo)-xylyl]-toluene: 1%

Preparation G - 2

Preparation G - 0: 99%

1-(4-phenylazo-phenylhydrazono)-1,2-dihydro-2-oxo-naphthalene (g): 1%

Preparation G - 3

Preparation G - 0: 99%

6-(1-phenylazo-4-naphthyl-azo)-2,3-dihydro-2,2-dimethyl-perimidine (i"): 1%

Preparation G - 4

Preparation G - 0: 99%

1-(4-phenylazo-phenylazo)-2-ethylaminonaphthalene (i): 1%

Preparation G - 5

Preparation G - 0: 99%

(1:2) chromium complex, in equivalent mixture, of the diazo derivative of (2-amino-5-nitro-4-ethylsulfonyl-phenol) → 2-(2-carboxy-phenyl)-naphthylamine, sodium salt and the diazo derivative of (2-amino-5-nitro-4-ethylsulfonyl-phenol) → 8-hydroxy-quinoline, sodium salt: 1%

Preparation G - 6
Preparation G - 0: 99%

(1:2) chromium complexes, in equivalent mixture, of the following azo compounds:
1-(2-hydroxy-5-nitro-phenylazo)-2-naphthol, sodium salt;
1-(2-hydroxy-4-nitro-phenylazo)-2-naphthol, sodium salt;
1-(2-hydroxy-3-nitro-5-tert-amyl-phenylazo)-2-naphthol, sodium salt: 1%

These preparations were kept for 30 days at 22° ± 2°C in hermetically sealed containers; at the end of that period, the amount of DDVP destroyed was measured potentiometrically.

The amount of acid present in the DDVP was taken into account and this was deducted from the results obtained.

The percentage amounts of the DDVP which decomposed were recorded and are given in the following table:

| G - 0 | G - 1 | G - 2 | G - 3 | G - 4 | G - 5 | G - 6 |
|-------|-------|-------|-------|-------|-------|-------|
| 21.0  | 5.3   | 8.0   | 4.9   | 3.1   | 3.2   | 8.7   |

EXPERIMENT H

Seven solutions containing an equimolar mixture of DDVP and 1-octanol were prepared as follows:
Preparation H - 0
 DDVP, technical 62.9%

1-octanol: 37.1%

Preparation H - 1
 Preparation H - 0: 99%

α-(1-naphthylhydrazono)-[4-(1,2-dihydro-2-oxo-phenylidenehydrazo)-xylyl]-toluene: 1%

Preparation H - 2
 Preparation H - 0: 99%

1-(4-phenylazo-phenylhydrazono)-1,2-dihydro-2-oxo-naphthalene (g): 1%

Preparation H - 3
 Preparation H - 0: 99%

1-xylylhydrazono-1,2-dihydro-2-oxo-naphthalene (g''): 1%

Preparation H - 4
 Preparation H - 0: 99%

6-(1-phenylazo-4-naphthyl-azo)-2,3-dihydro-2,2-dimethyl-perimidine (i''): 1%

Preparation H - 5
 Preparation H - 0: 99%

1-(4-phenylazo-phenylazo)-2-ethylaminonaphthalene (i): 1%

Preparation H - 6
 Preparation H - 0: 99%

(1:2) chromium complex, in equivalent mixture, of the diazo derivative of (2-amino-5-nitro-4-ethylsulfonyl-phenol) → 2-(2-carboxy-phenyl)-naphthylamine, sodium salt and the diazo derivative of (2-amino-5-nitro-4-ethylsulfonyl-phenol) → 8-hydroxy-quinoline, sodium salt: 1%

These preparations were kept for 60 days at 22° ± 2°C in hermetically sealed containers; at the end of that period, the amount of DDVP destroyed was measured and the results obtained were tabulated as follows:

| H - 0 | H - 1 | H - 2 | H - 3 | H - 4 | H - 5 | H - 6 |
|-------|-------|-------|-------|-------|-------|-------|
| 20.7  | 9.7   | 9.5   | 9.6   | 5.4   | 4.8   | 5.1   |

EXPERIMENT I

Seven solutions containing an equimolar mixture of DDVP and 2-octanol were prepared as follows:
Preparation I - 0
 DDVP, technical: 62.9%

2-octanol: 37.1%

Preparation I - 1
 Preparation I - 0: 99%

α-(1-naphthylhydrazono)-[4-(1,2-dihydro-2-oxophenylidenehydrazo)-xylyl]-toluene: 1%

Preparation I - 2
 Preparation I - 0: 99%

1-(4-phenylazo-phenylhydrazono)-1,2-dihydro-2-oxo-naphthalene (g): 1%

Preparation I - 3
 Preparation I - 0: 99%

1-xylylhydrazono-1,2-dihydro-2-oxo-naphthalene (g''): 1%

Preparation I - 4
 Preparation I - 0: 99%

6-(1-phenylazo-4-naphthyl-azo)-2,3-dihydro-2,2-dimethyl-perimidine (i''): 1%

Preparation I - 5
 Preparation I - 0: 99%

1-(4-phenylazo-phenylazo)-2-ethylaminonaphthalene (i): 1%

Preparation I - 6
 Preparation I - 0: 99%

(1:2) chromium complexes, in equivalent mixture, of the following azo compounds:

1-(2-hydroxy-5-nitro-phenylazo)-2-naphthol, sodium salt;
1-(2-hydroxy-4-nitro-phenylazo)-2-naphthol, sodium salt;
1-(2-hydroxy-3-nitro-5-tert-amyl-phenylazo)-2-naphthol, sodium salt:     1%

These preparations were treated as described for Experiment U (60 days at 22° ± 2°C) and the results obtained were the following:

| 1 - 0 | 1 - 1 | 1 - 2 | 1 - 3 | 1 - 4 | 1 - 5 | 1 - 6 |
|---|---|---|---|---|---|---|
| 15.3 | 7.1 | 4.1 | 8.7 | 5.1 | 4.5 | 4.5 |

EXPERIMENT J

Two solutions containing an equimolar mixture of DDVP and tertiary butanol were prepared as follows:

Preparation J - 0
DDVP, technical:     74.9% tertiary butanol:     25.1%

Preparation J - 1
Preparation J - 0:     99% azobenzene (e):     1%

These preparations were treated as described in Experiment G (30 days at 22° ± 2°C) and the following results were obtained:

| J - 0 | J - 1 |
|---|---|
| 3.8 | 1.9 |

EXPERIMENT K

The same mixtures are prepared as were prepared in Experiment J, being here designated K - 0 and K - 1.

These preparations were kept for 30 days at 40° ± 2°C in hermetically sealed containers; at the end of that period, the percentage amounts of DDVP destroyed were measured and the results obtained were tabulated as follows:

| K - 0 | K - 1 |
|---|---|
| 11.4 | 5.1 |

These results of Experiments G to K clearly show to what extent DDVP is susceptible to the action of an alcoholic compound, even at ambient temperature, when it is not protected.

These experiments also show that this action can be reduced considerably when a diazene is added to the composition containing the phosphoric acid ester and the alcoholic compound.

Non-limitative examples of certain forms of stabilised insecticidal compositions will now be described.

EXAMPLES 1-11

Stabilised insecticidal compositions in concentrated form useful for the production of insecticidal formulations and comprising DDVP as phosphoric ester, an alcoholic compound, carrying an alcoholic hydroxyl group, as solvent, and an epoxy compound as stabiliser.

EXAMPLES 1-11

| Example No. | 1 | 2 | 3 | 4 | 5 | 6 | 7 | 8 | 9 | 10 | 11 |
|---|---|---|---|---|---|---|---|---|---|---|---|
| DDVP % | 50 | 58 | 54 | 54 | 54 | 70 | 62 | 60 | 65 | 54 | 58 |
| 2-Ethyl-butanol % | — | — | — | — | — | — | 32 | — | — | — | — |
| 2-Ethoxy-ethanol % | — | — | — | — | — | — | — | 34 | — | — | — |
| 2-Butoxy-ethanol % | — | — | — | — | — | — | — | — | 30 | — | — |
| n. Heptanol % | 43 | — | — | — | — | — | — | — | — | — | — |
| 2-Ethyl-hexanol % | — | — | — | — | — | — | — | — | — | 40 | — |
| n. Octanol % | — | 36 | 40 | — | — | — | — | — | — | — | — |
| Sec. Octanol % | — | — | — | 42 | 42 | 27 | — | — | — | — | — |
| n. Dodecanol % | — | — | — | — | — | — | — | — | — | — | 35 |
| Epoxidised soya oil % (a) | 7 | — | 6 | 4 | — | 3 | — | 6 | — | 6 | — |
| Alkyl epoxy-stearate % (d) | — | 6 | — | — | — | — | 6 | — | — | — | 7 |
| Cycloalkyl epoxy-stearate % (e) | — | — | — | — | 4 | — | — | — | 5 | — | — |

EXAMPLES 12-19

Stabilised insecticidal compositions, in concentrated form, useful for the production of insecticidal and acaricidal formulations, and comprising DDVP as phosphoric ester, acetone as solvent, an acaricide (chlorobenzilate, chloropropylate) and an epoxy compound as stabiliser.

EXAMPLES 12-19

| Example No. | 12 | 13 | 14 | 15 | 16 | 17 | 18 | 19 |
|---|---|---|---|---|---|---|---|---|
| DDVP % | 20 | 20 | 20 | 18 | 18 | 16 | 16 | 16 |
| Chlorobenzilate % (g) | 10 | — | — | — | — | — | — | — |
| Chloropropylate % (h) | — | 10 | 10 | 12 | 12 | 6 | 6 | 8 |
| Epoxidised soya oil % (a) | 3 | 3 | — | 4 | — | 2 | — | — |
| Octyl epoxystearate % (f) | — | — | 3 | — | — | — | — | 3 |

EXAMPLES 12-19

| Example No. | 12 | 13 | 14 | 15 | 16 | 17 | 18 | 19 |
|---|---|---|---|---|---|---|---|---|
| Alkyl epoxystearate % (d) | — | — | — | — | 4 | — | — | — |
| Cycloalkyl-epoxy-stearate % (e) | — | — | — | — | — | — | 3 | — |
| Acetone % | 67 | 67 | 67 | 66 | 66 | 76 | 75 | 73 |

(g) common name for ethyl 4,4'-dichlorobenzilate, manufactured and sold by CIBA-GEIGY AG. Basel, Switzerland.

(h) common name for isopropyl 4,4'-dichloro benzilate, manufactured and sold by CIBA-GEIGY AG. Basel, Switzerland.

EXAMPLES 20-31

Stabilised insecticidal compositions in concentrated form, useful for the production of odorant insecticide formulations and comprising DDVP as phosphoric ester, a terpene alcohol (linalol, terpineol, citronellol, menthol, 1-octene-3-ol) and/or an essential oil (essence of rose wood, essence of curly mint, essence of palmarosa, essence of lavender), an epoxy compound as stabiliser.

EXAMPLES 20-31

| Example No. | 20 | 21 | 22 | 23 | 24 | 25 | 26 | 27 | 28 | 29 | 30 | 31 |
|---|---|---|---|---|---|---|---|---|---|---|---|---|
| DDVP % | 91 | 93 | 91 | 94 | 92 | 94 | 94 | 92 | 92 | 95 | 92 | 92 |
| Linalol % | 7 | — | — | — | — | — | — | — | — | — | 3 | 3 |
| Terpineol % | — | 5 | — | — | — | — | — | — | — | — | — | — |
| Citronellol % | — | — | 6 | — | — | — | — | — | — | — | — | — |
| Menthol % | — | — | — | 4 | — | — | — | — | — | 1 | — | — |
| 1-Octene-3-ol | — | — | — | — | — | — | — | 2 | 2 | — | — | — |
| Essence of rose-wood % | — | — | — | — | 6 | — | — | — | 4 | — | — | — |
| Essence of curly mint % | — | — | — | — | — | 5 | — | — | — | 3 | — | — |
| Essence of Palma-rosa % | — | — | — | — | — | — | 5 | — | — | — | — | — |
| Essence of lavender % | — | — | — | — | — | — | — | 4 | — | — | 3 | 3 |
| Octyl-epoxy-stearate % (f) | — | 2 | — | 2 | — | — | — | 2 | — | 2 | — | — |
| Epoxidised soya oil % (a) | 2 | — | 3 | — | 2 | 1 | 1 | 2 | — | 1 | — | 2 |

EXAMPLES 32-34

| | Example No. | 32 | 33 | 34 |
|---|---|---|---|---|
| (a) | DDVP | 3.8 | 7.7 | 8.8 |
| (b) | Alcoholic component | | | |
| | rose-wood essence (ca. 85–93% linalol, geraniol, nerol, terpineol) | 0.5 | 1 | — |
| | Citronellol | — | — | 0.8 |

Continued

| (c) | Stabilizer | | | |
|---|---|---|---|---|
| | Sudan blue (b") | 0.1 | — | — |
| | Bordeaux Organol B (a") | — | 0.2 | — |
| | Fat Black HB (c") | — | — | 0.1 |
| (d) | Paraffin Carrier (non-hydroxylated solvent) | | | |
| | "Isopar L" (a) | — | — | — |
| | "Soltrol 160" (b) | — | 51.1 | — |
| | n-dodecane | 65.6 | — | 85.3 |
| | Co-solvent | | | |
| | 1-chloro-dodecane | — | — | 5 |
| | 1,4-diisopropyl benzene | 30 | 40 | — |

(a") synthetic dye produced by the Compagnie Francaise des Matieres Colorantes of Paris, France, and acting as stabilizer for DDVP.

(b") synthetic dye produced by the German company Badische Anilin und Soda Fabrik of Ludwigshafen, Germany, and acting as stabilizer for DDVP.

(c") synthetic dye produced by the German company Farbwerke Hoechst of Frankfurt, Main, Germany, and acting as stabilizer for DDVP.

EXAMPLES 35-40

(amounts are given in grams)

| | Example No. | 35 | 36 | 37 | 38 | 39 | 40 |
|---|---|---|---|---|---|---|---|
| (a) | DDVP | 4.8 | 5.8 | 4.9 | 5.3 | 7.5 | 7.5 |
| (b) | Alcoholic component | | | | | | |
| | Linalol | — | 0.4 | — | 0.4 | — | — |
| | 2-Octanol | — | — | — | — | 5.5 | 5.5 |
| | terpineol | 1 | — | 1 | — | — | — |
| (c) | Stabilizer for DDVP | | | | | | |
| | octylepoxystearate (d") | 0.2 | 0.1 | 0.2 | 0.1 | — | — |
| | 2,4,6-trichlorophenol | — | — | — | — | — | 0.2 |
| | epoxidised soya oil (e") | — | — | — | — | 0.5 | — |

EXAMPLES 35–40 — Continued (amounts are given in grams)

| Example No. | 35 | 36 | 37 | 38 | 39 | 40 |
|---|---|---|---|---|---|---|
| (d) Paraffin Carrier (non-hydroxylated solvent) | | | | | | |
| "Isopar L" (a) | 74.0 | 89.0 | — | — | 86.6 | 86.8 |
| "Soltrol 160" (b) | — | — | 73.9 | 89.0 | — | — |
| Co-solvent | | | | | | |
| Isophorone | 20 | — | 20 | — | — | — |
| 2-Octanone | — | 5 | — | — | — | — |
| Linalyl acetate | — | 0.2 | — | 0.2 | — | — |

(d'') product sold under the Trade Mark "OXY-ES" by the French Company Melle-Bezons.

EXAMPLES 41–45

| Example No. | 41 | 42 | 43 | 44 | 45 |
|---|---|---|---|---|---|
| (a) DDVP | 7.5 | 7.5 | 7.2 | 6.0 | 7.3 |
| (b) Alcoholic Component | | | | | |
| 1-Heptanol | — | — | 6 | — | 5.5 |
| 1-Octanol | 5 | 2.5 | — | — | — |
| 2-Octanol | — | 2.5 | — | — | — |
| Spearmint oil (45–60% menthol) | — | — | — | 1.0 | — |
| Linalol | — | — | — | — | 0.3 |
| (c) Stabilizer for DDVP | | | | | |
| 2,4,6-trichloro-phenol | — | — | — | — | 0.3 |
| Epoxidised soya bean oil (e'') | 0.5 | 0.5 | 0.6 | 0.5 | — |
| (d) Paraffin Carrier (non-hydroxylated solvent) | | | | | |
| "Isopar L" (a) | 87.0 | 87.0 | — | 87.5 | — |
| "Soltrol 130" (b) | — | — | — | — | 86.5 |
| n-dodecane | — | — | 85.6 | — | — |
| Additive Materials | | | | | |
| Linalyl acetate | — | — | — | — | 0.1 |
| Menthone | — | — | 0.4 | — | — |
| Menthyl acetate | — | — | 0.2 | — | — |
| 2,4-dimethyl-6-metadioxanyl acetate | — | — | — | 5 | — |

(e'') product sold under the Trade Mark "Abrac A" by the British Company Boake, Roberts & Co. of London, England.

EXAMPLES 46 TO 53

Compositions which can be used in an evaporator and comprising DDVP as phosphoric acid ester, an alcoholic compound, and a diazene as principal stabilizer for the ester. These compositions may also contain a supplementary stabilizer for the ester (octyl epoxystearate, epoxidized soya bean oil).

(Values are expressed in weight percent).

The diazenes used in the following examples are designated as follows for convenience of tabulation:

Diazene I:
1-(4-phenylazo-phenylhydrazono)-1,2-dihydro-2-oxo-naphthalene; obtained coupling β-naphthol and diazotized 4-aminoazobenzene; this compound is often designated 1-(4-phenyl-azo-phenylazo)-2-naphthol corresponding to its azoic form;

Diazene II:
1-(2-methoxy-phenylhydrazono)-1,2-dihydro-2-oxo-naphthalene (g') obtained by coupling β-naphthol and diazotized o-anisidine;

Diazene III:
1-(4-o-tolylazo-2-methyl-phenylhydrazono)-1,2-dihydro-2-oxo-naphthalene (g''') obtained from coupling β-naphthol and diazotized 4-amino-2',3-dimethyl-azobenzene; this compound is often designated 1-(4-o-tolylazo-2-methyl-phenylazo)-2-naphthol corresponding to its azoic form;

Diazene IV:
1-(4-phenylazo-phenylazo)-2-ethylamino-naphthalene (i) obtained from coupling 2-ethylamino-naphthalene and diazotized 4-amino-azobenzene; this compound can also be considered to be 1-(4-phenylazo-phenylhydrazono)-1,2-dihydro-2-ethylimino-naphthalene corresponding to its hydrazono form;

Diazene V:
6-(1-phenylazo-4-naphthyl-azo)-2,3-dihydro-2,2-dimethyl-perimidine (i'') obtained from coupling 2,3-dihydro-2,2-dimethyl-perimidine and diazotized 1-amino-4-phenylazo-naphthalene.

Metallized Diazene VI:
(1:2) chromium complexes, in equivalent mixture, of the following azo compounds:
1-(2-hydroxy-5-nitro-phenylazo)-2-naphthol, sodium salt
1-(2-hydroxy-4-nitro-phenylazo)-2-naphthol, sodium salt
1-(2-hydroxy-3-nitro-5-tert-amyl-phenylazo)-2-naphthol, sodium salt Metallized Diazene VII:

(1:2) chromium complexes, in equivalent mixture, of diazo-(2-amino-5-nitro-4-ethylsulfonyl-phenol →2-(2-carboxy-phenyl)-naphthylamine, sodium salt and diazo-(2-amino-5-nitro-4-ethylsulfonyl-phenol) → 8-hydroxy-quinoline, sodium salt.

EXAMPLES 54 TO 86

Compositions comprising concentrates for the preparation of insecticidal formulations containing DDVP as phopshoric acid ester, an alcoholic compound selected from acyclic hydroxyl compounds, a solvent for the ester (2-ethyl-butanol, 2-ethylethanol, 2-butoxy-ethanol, n-heptanol, 2-ethyl-hexanol, 1-octanol, 2-octanol, 1-dodecenol), a diazene as principal stabilizer of the ester, and, in some cases, epoxidized soya bean oil as supplementary stabilizer (values are expressed in weight percent).

EXAMPLES 46–53

|  | 46 | 47 | 48 | 49 | 50 | 51 | 52 | 53 |
|---|---|---|---|---|---|---|---|---|
| DDVP | 9.2 | 8.5 | 9.2 | 9.2 | 9.2 | 10.6 | 10.6 | 9.7 |
| "Isopar L" (y''') | 85.18 | 86 | 85.62 | 85.18 | 85.18 | 84.24 | 83.78 | 85.22 |
| 3,6,9-trioxa-undecane (y) | 5 | — | 5 | 5 | 5 | 5 | 5 | — |
| 5,8,11-trioxa-penta-decane (y') | — | 5 | — | — | — | — | — | 5 |
| epoxidized soya bean oil (y'') | 0.5 | 0.4 | — | 0.5 | 0.5 | — | 0.5 | — |
| Diazene IV | 0.08 | 0.06 | 0.12 | — | — | 0.08 | 0.06 | — |
| Diazene V | — | — | — | 0.04 | — | — | — | 0.04 |
| Diazene I | — | — | — | — | 0.02 | — | — | — |
| Diazene X | 0.04 | 0.04 | 0.06 | 0.08 | 0.1 | 0.08 | 0.06 | 0.04 |

EXAMPLES 54–64

|  | 54 | 55 | 56 | 57 | 58 | 59 | 60 | 61 | 62 | 63 | 64 |
|---|---|---|---|---|---|---|---|---|---|---|---|
| DDVP | 54 | 61 | 55 | 54 | 56 | 72 | 65 | 63 | 67 | 57 | 62 |
| 2-ethyl-butanol | — | — | — | — | — | — | 34 | — | — | — | — |
| 2-ethyl-ethanol | — | — | — | — | — | — | — | 36 | — | — | — |
| 2-butoxy-ethanol | — | — | — | — | — | — | — | — | 32 | — | — |
| n-heptanol | 45 | — | — | — | — | — | — | — | — | — | — |
| 2-ethyl-hexanol | — | — | — | — | — | — | — | — | — | 42 | — |
| 1-octanol | — | 38 | 40.4 | — | — | — | — | — | — | — | — |
| 2-octanol | — | — | — | 42.5 | 43.3 | 27.2 | — | — | — | — | — |
| 1-dodecanol | — | — | — | — | — | — | — | — | — | — | 37 |
| epoxidized soya bean oil (y'') | — | — | 4 | 3 | — | — | — | — | — | — | — |
| Diazene IV | — | 1 | — | 0.5 | — | 0.8 | — | — | 1 | — | — |
| Diazene V | 1 | — | 0.6 | — | 0.7 | — | 1 | 1 | — | 1 | 1 |

EXAMPLES 65–75

|  | 65 | 66 | 67 | 68 | 69 | 70 | 71 | 72 | 73 | 74 | 75 |
|---|---|---|---|---|---|---|---|---|---|---|---|
| DDVP | 54 | 61 | 55 | 54 | 56 | 72 | 65 | 63 | 67 | 57 | 62 |
| 2-ethyl-butanol | — | — | — | — | — | — | — | — | — | — | — |
| 2-ethyl-ethanol | — | — | — | — | — | — | — | 36 | — | — | — |
| 2-butoxy-ethanol | — | — | — | — | — | — | — | — | 32 | — | — |
| n-heptanol | 45 | — | — | — | — | — | — | — | — | — | — |
| 2-ethyl-hexanol | — | — | — | — | — | — | — | — | — | 42 | — |
| n-octanol | — | 38 | 40.4 | — | — | — | — | — | — | — | — |
| sec-octanol | — | — | — | 42.5 | 43.3 | 27.2 | — | — | — | — | — |
| n-dodecanol | — | — | — | — | — | — | — | — | — | — | 37 |
| epoxidized soya bean oil (y'') | — | — | 4 | 3 | — | — | — | — | — | — | — |
| Diazene I | 1 | — | 0.6 | 0.5 | — | 0.8 | 1 | — | 1 | 1 | 1 |
| Diazene II | — | 1 | — | — | 0.7 | — | — | 1 | — | — | — |

EXAMPLES 76–86

|  | 76 | 77 | 78 | 79 | 80 | 81 | 82 | 83 | 84 | 85 | 86 |
|---|---|---|---|---|---|---|---|---|---|---|---|
| DDVP | 54 | 61 | 55 | 54 | 56 | 72 | 65 | 63 | 67 | 57 | 62 |
| 2-ethyl-butanol | — | — | — | — | — | — | 34 | — | — | — | — |
| 2-ethyl-ethanol | — | — | — | — | — | — | — | 36 | — | — | — |
| 2-butoxy-ethanol | — | — | — | — | — | — | — | — | 32 | — | — |
| n-heptanol | 45 | — | — | — | — | — | — | — | — | — | — |
| 2-ethyl-hexanol | — | — | — | — | — | — | — | — | — | 42 | — |
| n-octanol | — | 38 | 40.4 | — | — | — | — | — | — | — | — |
| sec-octanol | — | — | — | 42.5 | 43.3 | 27.2 | — | — | — | — | — |
| n-dodecanol | — | — | — | — | — | — | — | — | — | — | 37 |
| epoxidized soya bean oil (y″) | — | — | 4 | 3 | — | — | — | — | — | — | — |
| Metallized diazene VIII | 1 | — | 0.6 | — | — | — | 1 | — | 1 | — | 1 |
| Metallized diazene VI | — | 1 | — | 0.5 | 0.7 | 0.8 | — | 1 | — | 1 | — |

EXAMPLES 87 TO 114

Compositions comprising concentrates for the preparation of insecticidal and acaricidal formulations containing DDVP as phosphoric acid ester, an alcoholic compound selected from benzhydrol derivatives as acaricidally active substance (Chlorobenzilate, Chloropropylate), acetone as solvent, a diazene as principal stabilizer for the ester and, in some cases, an epoxidized compound (epoxidized soya bean oil or octyl epoxystearate) as supplementary stabilizer (values are expressed in weight percent).

EXAMPLES 115 TO 162

Concentrates for the preparation of scented insecticidal formulations comprising DDVP as phosphoric acid ester, an alcohol compound selected from acyclic hydroxyl compounds or from alicyclic hydroxyl compounds as scent (linalool, terpineol, citronnellol, menthol, octenol, rosewood oil, spearmint oil, palmarosa oil or lavender oil), one or two diazenes as principal stabilizer and, in some cases, an epoxidized compound (epoxidized soya bean oil) as supplementary stabilizer (values are expressed in weight percent).

EXAMPLES 87–96

|  | 87 | 88 | 89 | 90 | 91 | 92 | 93 | 94 | 95 | 96 |
|---|---|---|---|---|---|---|---|---|---|---|
| DDVP | 20 | 20 | 20 | 20 | 20 | 18 | 18 | 16 | 16 | 16 |
| Chlorobenzilate (z) | 10 | — | 10 | — | — | — | — | — | — | — |
| Chloropropylate (z′) | — | 10 | — | 10 | 10 | 12 | 12 | 6 | 6 | 8 |
| epoxidized soya bean oil (y″) | — | — | — | 2.8 | — | — | — | 2 | — | — |
| octyl epoxystearate (x) | — | — | — | — | — | — | 3 | — | — | — |
| acetone | 69.4 | 69.2 | 58.8 | 67 | 68.7 | 68.6 | 66.7 | 74.8 | 76.6 | 74.4 |
| Diazene I | — | — | 1.2 | 0.2 | 1.3 | 0.4 | 0.3 | 0.3 | 0.4 | 1.6 |
| Diazene X | 0.6 | 0.8 | — | — | — | 1.0 | — | 0.9 | 1.0 | — |

(z) trade name for ethyl 4,4′-dichloro-benzilate, manufactured and sold by CIBA-GEIGY AG., Basel, Switzerland.
(z′) trade name for isopropyl 4,4′-dichloro-benzilate, manufactured and sold by CIBA-GEIGY AG., Basel, Switzerland.

EXAMPLES 97–104

|  | 97 | 98 | 99 | 100 | 101 | 102 | 103 | 104 |
|---|---|---|---|---|---|---|---|---|
| DDVP | 20 | 20 | 20 | 18 | 18 | 16 | 16 | 16 |
| Chlorobenzilate % (z) | 10 | — | — | — | — | — | — | — |
| Chloropropylate % (z′) | — | 10 | 10 | 12 | 12 | 6 | 6 | 8 |
| epoxidized soya bean oil (y″) | — | 2.8 | — | — | — | 2 | — | — |
| octyl epoxystearate (x) | — | — | — | — | 3 | — | — | — |
| acetone | 68.8 | 67 | 69.2 | 68.6 | 66.7 | 75.7 | 76.6 | 74.4 |
| Diazene IV | 1.2 | 0.2 | 0.8 | 1.4 | 0.3 | 0.3 | 1.4 | 1.6 |

EXAMPLES 105–114

|  | 105 | 106 | 107 | 108 | 109 | 110 | 111 | 112 | 113 | 114 |
|---|---|---|---|---|---|---|---|---|---|---|
| DDVP | 18 | 16 | 20 | 20 | 20 | 18 | 18 | 16 | 16 | 16 |
| Chlorobenzilate (z) | 12 | — | 10 | — | — | — | — | — | — | — |
| Chloropropylate (z′) | — | 8 | — | 10 | 10 | 12 | 12 | 6 | 6 | 8 |
| epoxidized soya bean oil (y″) | — | — | — | 2.8 | — | — | — | 2 | — | — |
| octyl epoxystearate (x) | 3 | — | — | — | — | — | 3 | — | — | — |
| acetone | 66.7 | 74.5 | 68.6 | 67 | 68.7 | 68.4 | 66.7 | 75.7 | 77 | 74.8 |
| Metallized Diazene VIII | — | — | 1.2 | 0.2 | 1.3 | 1.6 | 0.3 | 0.3 | 1.0 | 1.2 |
| Diazene X | 0.3 | 1.5 | — | — | — | — | — | — | — | — |

EXAMPLES 115–126

| | 115 | 116 | 117 | 118 | 119 | 120 | 121 | 122 | 123 | 124 | 125 | 126 |
|---|---|---|---|---|---|---|---|---|---|---|---|---|
| DDVP | 92 | 94 | 94 | 95 | 93 | 94 | 94 | 93 | 91 | 94 | 92 | 92 |
| linalool | 7.6 | — | — | — | — | — | — | — | — | — | 3 | 3 |
| terpineol | — | 5.4 | — | — | — | — | — | — | — | — | — | — |
| citronellol | — | — | 5.4 | — | — | — | — | — | — | — | — | — |
| menthol | — | — | — | 4.6 | — | — | — | — | — | 1 | — | — |
| 1-octen-3-ol | — | — | — | — | — | — | — | 2.2 | 2 | — | — | — |
| rosewood oil (z″) | — | — | — | — | 6.6 | — | — | — | 4 | — | — | — |
| spearmint oil (z‴) | — | — | — | — | — | 5.6 | — | — | — | 3 | — | — |
| palmarosa oil (z″″) | — | — | — | — | — | — | 5.4 | — | — | — | — | — |
| lavender oil (z″″″) | — | — | — | — | — | — | — | 4 | — | — | 3 | 3 |
| epoxidized soya bean oil (y″) | — | — | — | — | — | — | — | — | 2.5 | 1.5 | 1.4 | 1.4 |
| Diazene I | 0.4 | — | — | 0.4 | 0.4 | — | 0.6 | 0.8 | 0.5 | — | 0.6 | 0.6 |
| Diazene III | — | 0.6 | 0.6 | — | — | 0.4 | — | — | — | 0.5 | — | — |

(z″) natural essence containing linalool, geraniol and terpineols
(z‴) natural essence containing menthol
(z″″) natural essence containing geraniol and citronellol
(z″″″) natural essence containing linalool and geraniol.

EXAMPLES 127–138

| | 127 | 128 | 129 | 130 | 131 | 132 | 133 | 134 | 135 | 136 | 137 | 138 |
|---|---|---|---|---|---|---|---|---|---|---|---|---|
| DDVP | 92 | 94 | 94 | 95 | 93 | 94 | 94 | 93 | 91 | 94 | 92 | 92 |
| linalool | 7.6 | — | — | — | — | — | — | — | — | — | 3 | 3 |
| terpineol | — | 5.4 | — | — | — | — | — | — | — | — | — | — |
| citronellol | — | — | 5.4 | — | — | — | — | — | — | — | — | — |
| menthol | — | — | — | 4.6 | — | — | — | — | — | — | — | — |
| 1-octen-3-ol | — | — | — | — | — | — | — | 2.2 | 2 | — | — | — |
| rosewood oil (z″) | — | — | — | — | 6.6 | — | — | — | — | 4 | — | — |
| spearmint oil (z‴) | — | — | — | — | — | 5.6 | — | — | — | 3 | — | — |
| palmarosa oil (z″″) | — | — | — | — | — | — | 5.4 | — | — | — | — | — |
| lavender oil (z″″″) | — | — | — | — | — | — | — | 4 | — | — | 3 | 3 |
| epoxidized soya bean oil (y″) | — | — | — | — | — | — | — | — | 2.5 | 1.5 | 1.4 | 1.4 |
| Diazene IV | 0.4 | 0.6 | — | — | 0.4 | — | — | 0.8 | 0.5 | — | — | 0.6 |
| Diazene V | — | — | 0.6 | 0.4 | — | 0.4 | 0.6 | — | — | 0.5 | 0.6 | — |

EXAMPLES 139–150

| | 139 | 140 | 141 | 142 | 143 | 144 | 145 | 146 | 147 | 148 | 149 | 150 |
|---|---|---|---|---|---|---|---|---|---|---|---|---|
| DDVP | 92 | 94 | 94 | 95 | 93 | 94 | 94 | 93 | 91 | 94 | 92 | 92 |
| linalool | 7.6 | — | — | — | — | — | — | — | — | — | 3 | 3 |
| terpineol | — | 5.4 | — | — | — | — | — | — | — | — | — | — |
| citronellol | — | — | 5.4 | — | — | — | — | — | — | — | — | — |
| menthol | — | — | — | 4.6 | — | — | — | — | — | 1 | — | — |
| 1-octen-3-ol | — | — | — | — | — | — | — | 2.2 | 2 | — | — | — |
| rosewood oil (z″) | — | — | — | — | 6.6 | — | — | — | 4 | — | — | — |
| spearmint oil (z‴) | — | — | — | — | — | 5.6 | — | — | — | 3 | — | — |
| palmarosa oil (z″″) | — | — | — | — | — | — | 5.4 | — | — | — | — | — |
| lavender oil (z″″″) | — | — | — | — | — | — | — | 4 | — | — | 3 | 3 |
| epoxidized soya bean oil (y″) | — | — | — | — | — | — | — | — | 2.5 | 1.5 | 1.4 | 1.4 |
| Metallized diazene VIII | — | — | — | 0.4 | 0.4 | — | 0.6 | — | 0.5 | — | 0.6 | — |
| Metallized diazene VI | 0.4 | 0.6 | 0.6 | — | — | 0.4 | — | 0.8 | — | 0.5 | — | 0.6 |

EXAMPLES 151–162

| | 151 | 152 | 153 | 154 | 155 | 156 | 157 | 158 | 159 | 160 | 161 | 162 |
|---|---|---|---|---|---|---|---|---|---|---|---|---|
| DDVP | 92 | 94 | 95 | 93 | 94 | 93 | 92 | 94 | 91 | 93 | 96 | 93 |
| linalool | 7.5 | — | — | — | — | 3 | 1 | — | — | 2 | — | — |
| citronellol | — | 5.2 | — | — | — | — | — | 5 | 6.5 | — | — | — |
| menthol | — | — | 4.2 | — | — | — | — | — | — | — | 3 | 4 |

EXAMPLES 151-162—Continued

|  | 151 | 152 | 153 | 154 | 155 | 156 | 157 | 158 | 159 | 160 | 161 | 162 |
|---|---|---|---|---|---|---|---|---|---|---|---|---|
| DDVP | 92 | 94 | 95 | 93 | 94 | 93 | 92 | 94 | 91 | 93 | 96 | 93 |
| rosewood oil (z″) | — | — | — | 6.4 | — | — | — | — | — | 4 | — | — |
| palmarosa oil (z″″) | — | — | — | — | 5.3 | — | — | — | — | — | — | — |
| lavender oil (z″″′) | — | — | — | — | — | 3.2 | 4 | — | — | — | — | — |
| epoxidized soya bean oil (y″) | — | — | — | — | — | — | 2.4 | — | 1.5 | — | — | 2 |
| Diazene IV | — | — | — | — | — | — | — | 0.4 | — | — | — | — |
| Diazene V | — | — | — | — | — | — | — | — | 0.5 | 0.5 | — | — |
| Metallized Diazene VI | — | — | — | — | — | — | — | — | 0.5 | — | 0.6 | 0.6 |
| Diazene X | 0.5 | 0.8 | 0.8 | 0.6 | 0.7 | 0.8 | 0.6 | 0.6 | — | 0.5 | 0.4 | 0.4 |

We claim:
1. A stabilized insecticidal composition comprising
A. about 1 to 95 percent of at least one phosphoric acid ester insecticide defined by the general formula

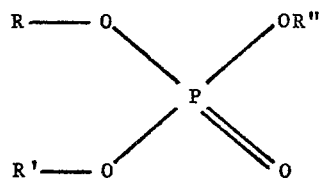

in which
R and R″ are the same or different alkyl groups containing from 1 to 3 carbon atoms, and R′ is one of the following two groups

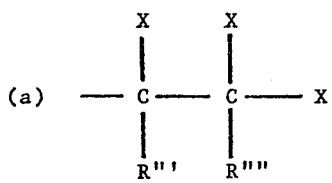

in which R‴ and R″″ are the same or different and are each hydrogen, chlorine, bromine, or alkyl of from 1 to 3 carbon atoms, and X is chlorine or bromine;

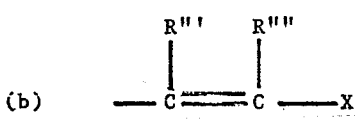

in which R‴, R″″ and X have the meanings given above,
B. about 1 to 80 percent of a compound having at 20°C a vapor pressure between 0.01 and 30 TORR and carrying per molecule at least one alcoholic hydroxyl group and acting as solvent on (A) and which compound is selected from
   1. aliphatic saturated and unsaturated primary, secondary and tertiary alcohols,
   2. saturated and unsaturated alicyclic alcohols,
   3. aralkanols and aralkenols, and
   4. glycols and their monoesters and monoethers,
C. from about 0.1 to 20 percent of a stabilizing agent for said phosphoric ester, selected from
   (α) compounds containing an epoxy group, and selected from:
   an alkyloxitane,
   an aryloxitane,
   an epoxy cyclane and
   an epoxidised ester
   (β) a diazene, and
   (γ) a mixture of a compound as defined under (α) with a diazene, all percentages being based on the total weight of the composition.

2. A stabilized insecticidal composition as described in claim 1, further comprising as component (D) a saturated aliphatic hydrocarbon of weak solvent power for said insecticidal phosphoric ester which component (D) acts as a co-solvent in conjunction with component (B) for the insecticidal phosphoric ester.

3. A stabilized insecticidal composition as described in claim 1, wherein the proportion of said insecticidal phosphoric ester ranges from 3 to 25 percent of the weight of the composition.

4. A stabilized insecticidal composition as described in claim 2, wherein said component (D) has a vapor pressure at 20°C between 0.001 and 30 Torr.

5. A stabilized insecticidal composition as described in claim 1, wherein said epoxy compound is selected from alkyloxitanes, epoxycyclanes, epoxidized acid esters, glycerides containing an epoxidized acyl residue and ethyl phenylgylcidate.

6. A stabilized insecticidal composition as described in claim 1, wherein the proportion of the stabilizing agent (C) is from 0.2 to 10 percent of the weight of the composition.

7. A stabilized insecticidal composition as described in claim 5, wherein said epoxy compound is selected from the alkyl and cycloalkyl 9,10-epoxy-stearates and the glycerides of epoxy-stearic acids.

8. A composition as described in claim 7, wherein the epoxy compound is selected from the epoxidised oils of soya, poppy, sunflower, flax and china wood.

9. A composition as described in claim 1, wherein the quantity of the stabilizing agent is at least stoichiometrically equal to the compensation of the sum of the acidity present in the composition, taken together with the potential acidity which can result from the hydrolysing action of humidity on the phosphoric ester of the composition.

10. A composition as described in claim 1, wherein the insecticidal phosphoric ester is 0-2,2-dichlorovinyl-0,0-dimethyl phosphate.

11. A composition as described in claim 1, wherein the organic compound carrying at least one alcoholic hydroxyl group is an odorant.

12. A composition as described in claim 1, wherein the organic compound carrying at least one alcoholic hydroxyl group is selected from the group consisting of an acaricidal agent, an insectifugal agent, a bird repelling agent, a fungicidal agent and a plant growth-regulating agent.

* * * * *